Figure 1:
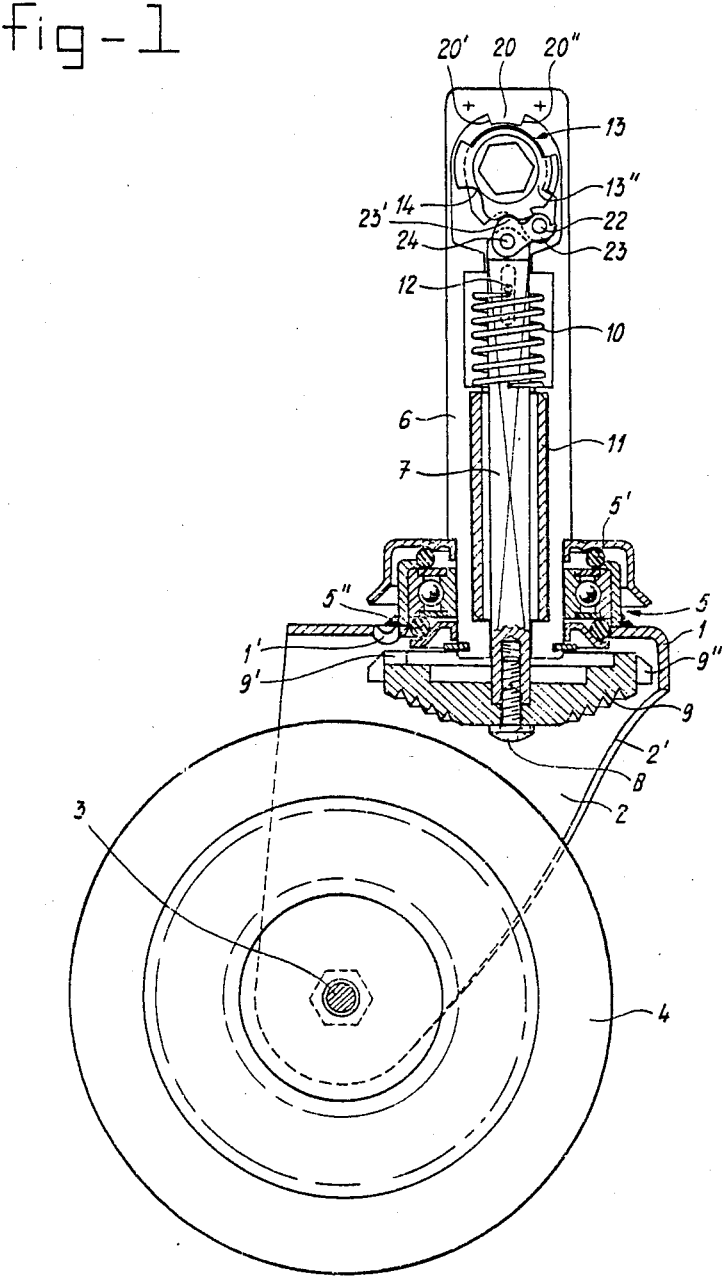

United States Patent [19]

Timmer et al.

[11] Patent Number: 4,815,161
[45] Date of Patent: Mar. 28, 1989

[54] SWIVELING WHEEL

[75] Inventors: Hendrikus J. M. Timmer, Tiel; Paul Lindhout, Veenendaal, both of Netherlands

[73] Assignee: SKF Transportwielen B.V., Veenendaal, Netherlands

[21] Appl. No.: 143,469

[22] Filed: Jan. 12, 1988

[30] Foreign Application Priority Data

Jan. 22, 1987 [NL] Netherlands .................. 8700155

[51] Int. Cl.$^4$ .............................................. B60B 33/00
[52] U.S. Cl. ........................................ 16/35 R; 188/1.12
[58] Field of Search ....................... 16/35 R; 188/1.12

[56] References Cited

U.S. PATENT DOCUMENTS 3,988,800 11/1976 Sachser ........................... 16/35 R
4,414,702 11/1983 Neumann ....................... 188/1.12
4,677,706 7/1987 Screen ............................ 16/35 R
4,722,114 2/1988 Neumann ........................ 16/35 R Primary Examiner—R. K. Seidel
Attorney, Agent, or Firm—Rosen, Dainow & Jacobs

[57] ABSTRACT

An improved swiveling wheel assembly comprising a brake member including a toggle lever mechanism comprising a first and a second element rotatably connected together. The first element is rotatably fastened to the upper end of a rod-shaped locking member and the second element is rotatably connected to a vertical fastening member. A coupling means is also included and used for coupling one of the first and second elements to a cam member whereby, when the cam member rotates from a first or second position into a third position, the toggle lever mechanism is brought from an unextended position into essentially an extended position, wherein a line drawn between the axes of rotation of the toggle lever mechanism is essentially aligned with the longitudinal axis of the locking member and the locking member is displaced downward against a spring member with respect to the first and second positions whereby a lower edge of a locking disk is pressed against the wheel.

8 Claims, 4 Drawing Sheets

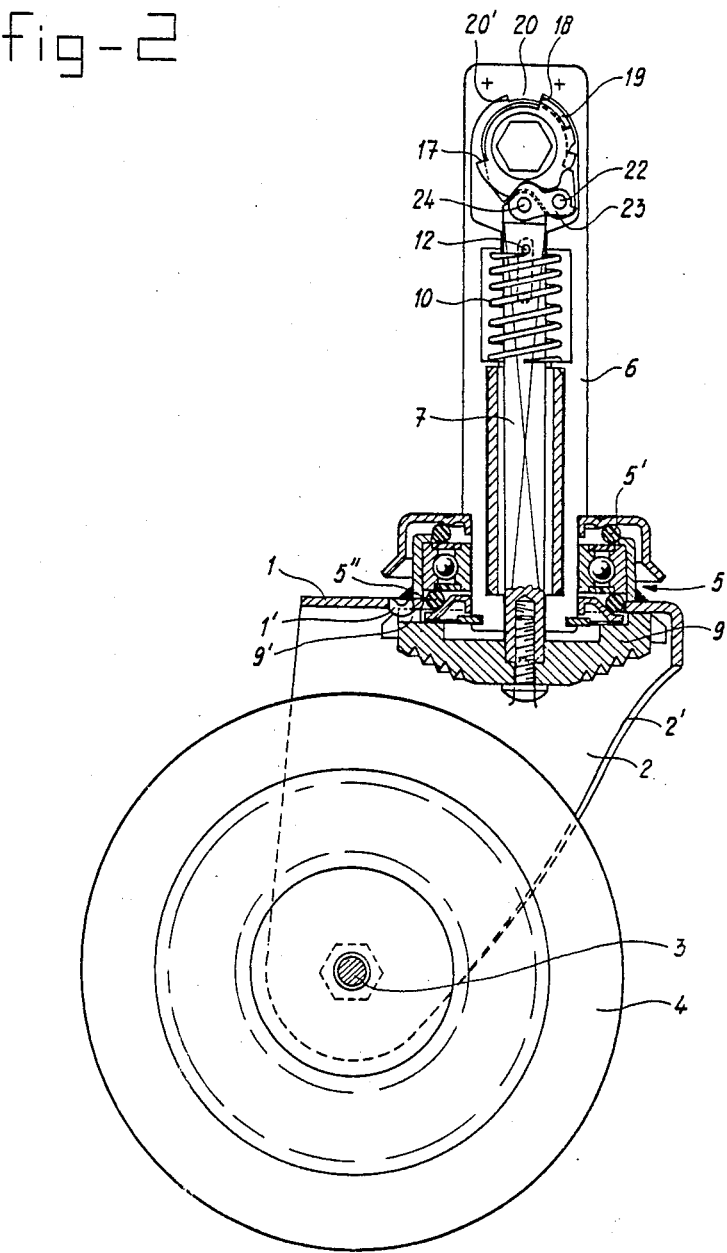

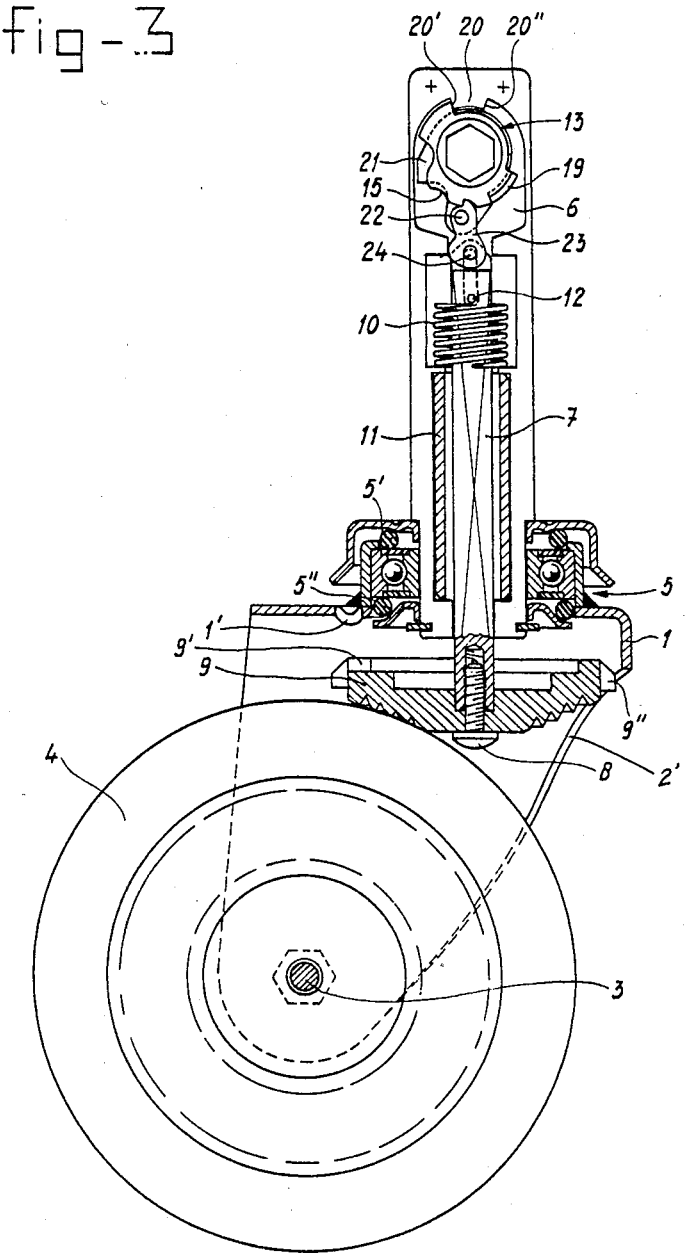

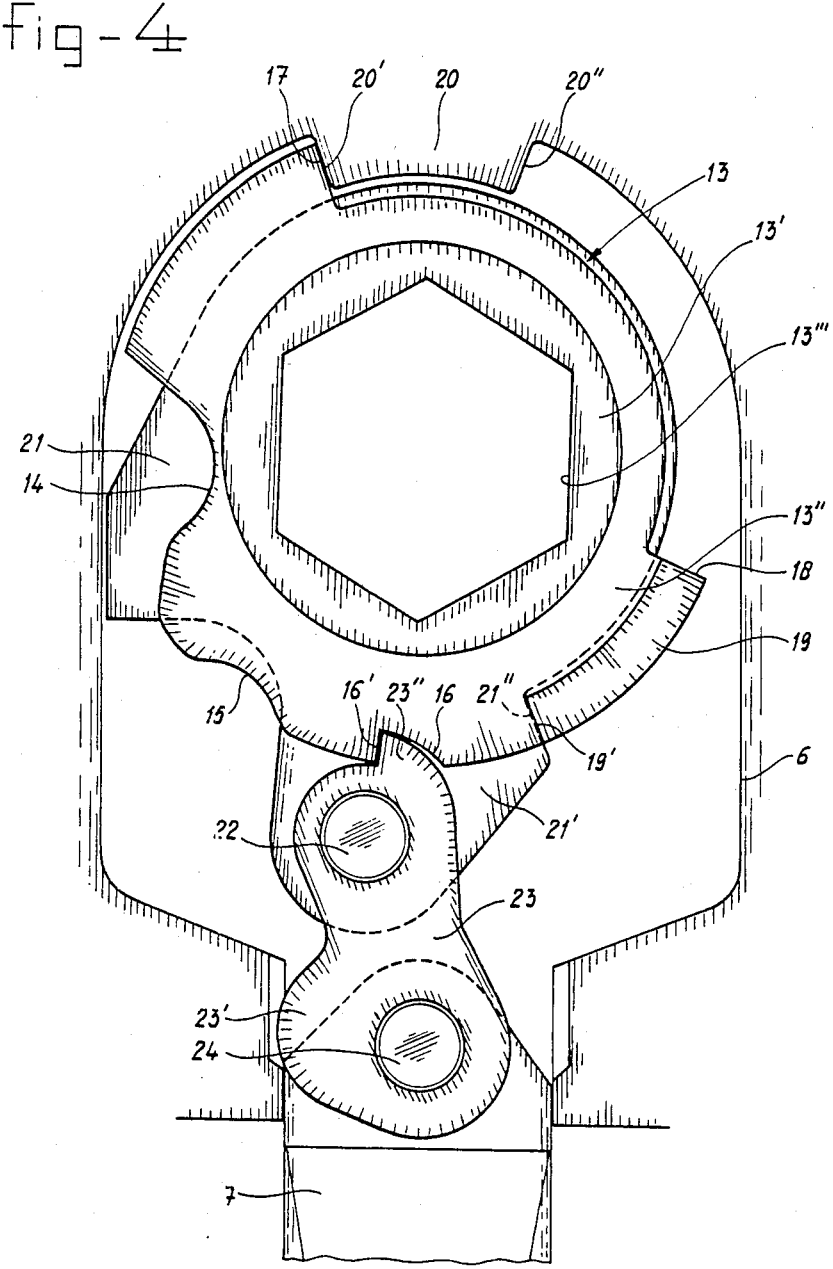

SWIVELING WHEEL

The invention relates to a swiveling wheel assembly comprising a yoke having a top plate running generally horizontally and two lugs, projecting downward, between which a wheel is pivoted, which top plate is connected so as to freely rotate about a vertical axis of rotation with a vertical fastening member for fastening the swiveling wheel to an object, in particular a leg of a hospital bed, where a generally rod-shaped locking member is slidably guided by the fastening member, which locking member, at the lower end, bears a locking disk and at the upper end a cam follower capable of cooperating with a cam member rotatably mounted in the fastening member about a shaft transverse to the vertical axis of rotation of the yoke, while a spring member is present, whereby the locking rod is under a spring tension, directed upward, which holds the cam follower in engagement with the cam member and, in addition there is present a brake member which may be pressed against the bearing surface of the wheel, all such that by turning the cam member, the locking rod and therewith the locking disk may be brought into three different positions with respect to the distance between said disk and the upper plate of the yoke. In a first position of the cam member and the locking rod, the yoke is capable of swinging freely about the vertical axis of rotation. In a second position of the cam member and the locking rod, the cam follower rests against a portion of the periphery of the cam member, and the radial distance from the axis of rotation of the said member is greater or smaller than that of the portion of the periphery of the cam member against which the cam follower rests in the first position of the cam member, and wherein the yoke is locked in at least one swivel position as a result of a tooth falling into a recess in the locking disk which tooth is connected to the yoke. In a third position of the cam member and the locking rod, the distance between the locking disk and the top plate of the yoke is greatest, and the brake member is pressed against the wheel. Such a swiveling wheel is disclosed in Japanese Pat. No. 60-135303.

In the known swiveling wheel the cam follower is formed at the top end of the locking rod by a knob, which in the first position of the cam member is accommodated in the periphery thereof in a first recess and in the second position in a second, shallower recess, while in the third position of the cam member the knob rests against the cylindrical periphery of the said member, in which third position the locking rod, with the locking disk fastening thereon, is displaced downward as far as possible. This means that the maximum possible stroke height of the locking disk with respect to the top plate of the yoke is determined by the maximum possible variation in radius of the cam member, such variation in radius in turn being determined by the wrench width of the control shaft and by the diameter of the vertical member, which for fastening the swiveling wheel in a foot of a hospital bed, may not exceed a given size. Now this maximum possible diameter of the fastening member is so great that, in a cam member having a maximum possible radius fitting this diameter, in the third position of the said member the locking disk may be displaced downward some distance from the wheel. Therefore, in the known swiveling wheel the brake member is formed by a separate brake shoe rotatably connected with the yoke, which in the third position of the cam member is pressed against the wheel by means of the locking disk.

Because a separate brake shoe must be provided in the known swiveling wheel, this wheel is relatively complicated from a design viewpoint, while in addition, such a brake shoe results in accumulations of dust, which in hospital beds are very undesirable.

The object of the invention is to procure a swiveling wheel of the type mentioned which does not have the disadvantages of the known swiveling wheel.

This object is accomplished in that, in the swiveling wheel according to the invention, there is provided a toggle lever mechanism consisting of two elements rotatably connected together, wherein the first element is rotatably fastened to the upper end of the rod-shaped locking member and the second element is rotatably connected with the vertical fastening member and means are present for a coupling of one of these elements with the cam member in such fashion that, when the cam member turns from the first or second position into the third position, the toggle lever is brought from a bent position into essentially an extended position, where the axes of rotation of the rotary connections of the toggle lever lie essentially on a line and the locking rod (7) is displaced downward against the spring pressure (10) with respect to the first and second positions, in such fashion that the lower edge of the locking disk (9) is pressed against the wheel (4).

In a swiveling wheel designed in this way, the brake member is thus formed by a portion of the locking disk so that no separate brake shoe is present. Owing to the fact that a toggle lever mechanism is provided between the fastening member and the upper end of the locking rod, of which lever the arms, in the third position of the cam member, lie approximately in the same straight line, the greatest possible distance between the locking disk and the top plate of the yoke is determined essentially by the sum of the lengths of the arms of this toggle lever, while the arms of the toggle lever, in the first and second positions of the cam member, are at an angle to one another.

The first and second elements of the toggle lever mechanism are preferably formed by, respectively, a link-shaped oblong element and at least one intermediate member that is rotatably mounted about the transverse axis of rotation of the cam member, so that the longitudinal axis of the link-shaped element is formed by the line through the axes of rotation of the rotary connections of this element with, respectively, the intermediate member and the locking rod, where in the first and second positions of the cam member the longitudinal axis of the link-shaped element, in the associated first and second positions of this element, extends essentially transverse to the locking rod, and the intermediate member is provided with the aforesaid means for coupling with the cam member such that, when the cam member turns from the first or second position into the third position, the intermediate member is turned into a position wherein the axis of rotation of the rotary connection between this member and the link-shaped element is located between the axis of rotation of its rotary connection with the locking rod and the axis of rotation of the cam member, so that the longitudinal axis of the link-shaped element then extends approximately in the line of the locking rod, means being present to prevent the drive member from being turned out of the said position by the spring pressure.

The link-shaped element is advantageously provided with a bulge above the rotary connection with the locking rod, which in the first and second positions of this element rest against the periphery of the cam member, so that the cam follower is formed by the link-shaped oblong element.

The link-shaped element, in its third position, is preferably turned just past the position in which the line of the longitudinal axis of this element runs through the axis of rotation of the cam member, while the link-shaped element is provided, near the rotary connection with the intermediate member, with a tooth-shaped projection which in the third position of this element is accommodated in a notch in the periphery of the cam member, the cam member being provided with a stop which, in this third position, rests against a fixed detent.

This design, in simple fashion, prevents the drive member and hence the link-shaped element from being turned past the said position by the spring pressure acting on the locking rod, and additionally prevents the reverse motion of the link-shaped element, toward the other edge, past the position wherein the line of the longitudinal axis of the link-shaped element runs through the axis of rotation of the cam-shaped member, due to the engagement of the tooth-shaped projection in the notch in the periphery of the cam member.

The means for coupling the intermediate member with the cam member are preferably formed by a part, projecting in an axial direction and formed on the cam member, which is capable of coming into engagement with a surface of the intermediate member running essentially radially.

The stop of the cam member is advantageously formed by a radial surface running inward from the periphery of the cam member, the detent being formed by a radial surface of a projection formed inside the vertical fastening member. At the same time, the cam member may be provided with a second radial surface, running inward from the periphery thereof, which in the first or second position of the cam member rests against a second radial surface of the said projection.

In this way, the cam-shaped member is prevented from turning too far when the said cam member turns from the third position into the first or second position.

Along its periphery, the locking disk is advantageously provided with a series of recesses, spaced equal distances apart, while at least one of the lugs of the yoke is provided with a projection directed inward which, in the third position of the locking rod and the locking disk, is capable of engaging in one of the said recesses.

In a locking disk designed in this way, when this disk acts as a brake shoe and the wheel is thus no longer able to rotate, the swiveling motion of the wheel is likewise blocked.

The invention is described in detail with reference to the drawing, wherein

FIGS. 1, 2 and 3 show, in vertical cross section, an embodiment of the swiveling wheel according to the invention wherein the cam member is in a first, second and third position, respectively, and FIG. 4 shows, on a larger scale, the cam-member mechanism in the third position of the cam member.

As shown in the drawing, the swiveling wheel assembly comprises a yoke consisting of a top plate 1 and two lugs 2, projecting downward, between which, at 3, is pivoted a wheel 4. By means of a ball bearing 5 securely held on the top plate 1, the yoke is connected, so as to be freely rotating, with a vertical cylindrical fastening member 6, while the ball bearing 5 is lubricated for life and is provided with sealing rings 5' and 5".

Within the fastening member 6 there is provided, a displaceable, locking rod 7, to which, at its lower end, is fastened by means of a screw 8 and a locking disk 9. A spring 10, has a lower end which rests against a shoulder 11 formed within the member 6 and has its other end which rests against a pin 12 projecting through the locking rod, thereby exerting a spring force, directed upward, on the locking rod 7.

Within the fastening member 6, near its upper end, a cam member 13 that is formed by a bush-shaped part 13' which at either end is accommodated to freely rotate in the openings in the fastening member 6, and hub part 13" projects radially from such bush-shaped part. The inner edge of the bush-shaped part 13" is designed polygonal 13''', so that the cam-shaped member 13 can be rotated by means of a socket-wrench inserted in its inner edge. In the periphery of the hub-shaped part 13" there is provided two round recesses 14 and 15, the recess 14 being deeper than the recess 15. In addition, a notch 16 having a surface 16' directed radially is formed in the periphery of the hub-shaped part 13" as are two radially directed surfaces 17 and 18. The latter radial surface 18 similarly forms one boundary surface of a part 19, projecting axially toward the two edges of the hub-shaped part 13", and which at the other edge of the part 19 is bounded by surfaces 19', directed radially. Inside the fastening member 6 is formed a projection 20, so that in one extreme rotary position of the cam member 13, shown in FIGS. 3 and 4, the radially directed surface 17 rests against one edge 20' of the projection 20, and in the other extreme rotary position of the cam member 13 the radially directed surface 18 rests against the other edge 20" of the projection 20, as shown in FIG. 2.

At either edge of the hub-shaped part 13" of the cam member 13, a generally annular intermediate member 21 is provided and mounted to rotate about the bush-shaped part 13" of the cam member. Each annular intermediate member 21 has an ear-shaped projection 21' that connects into the remaining part of the intermediate member via a radially directed surface 21".

By means of a pin 22, an oblong link-shaped element 23 is rotatably fastened between the lugs 21' of the intermediate members 21, this link-shaped element 23 being rotatably fastened at the other end, by means of the pin 24, to the upper end of the locking rod 7. The link-shaped element 23 is also provided with a rounded bulge 23' and with a tooth 23".

As shown in FIG. 1, in the first position of the cam member 13 the bulge 23' of the link-shaped element 23 lies in the shallow recess 15 of the cam member 13, the longitudinal axis of the link-shaped element 23 being roughly transverse to the longitudinal axis of the locking rod 7. In this position the locking disk 9 lies at a short distance from the lower edge of the top plate 1 of the yoke, whereby the locking plate 9 lies completely free and the yoke 1, 2 with the wheel 4 pivoted in between, is able to swing freely about the vertical central axis of the fastening member 6.

From the first position shown in FIG. 1, the cam member 13 may be turned into the second position shown in FIG. 2, whereupon the radial surface 18 comes to rest against the projection 20, so that the cam member 13 cannot be turned past this second position. In this second position of the cam member 13 the bulge 23' of the link-shaped element 23 lies in the deeper recess 14 of the cam member 13, whereby the locking rod 6, with respect to the position shown in FIG. 1, is displaced upward as a result of the compressive force exerted by the spring 10, and the locking disk 9 rests against the lower edge of the top plate 1 of the yoke. The locking disk 9 is provided with a recess 9', in which a projection 1' pressed out of the top plate 1 has come to reside, whereby swinging motion of the yoke about the vertical central axis of the securing member 6 is blocked.

From the position shown in FIG. 1 the cam member 13 may be turned to the left (clockwise) into the third position shown in FIGS. 3 and 4. During this rotary motion the intermediate member 21 is carried along because the radial surfaces 19' of the projection 19 rest against the radial surfaces 21'', whereby the point 22 of rotation is brought into the position shown in FIGS. 3 and 4 and the link-shaped element 23 is positioned so as to be approximately vertical. At the same time, the tooth 23'' has been positioned to lie in the notch 16, while the radial surface 17 of the cam member 13 has come to rest against the surface 20' of the projection 20, whereby the cam member 13 is unable to turn any further and, as a result, the link-shaped element 23 is held in the position shown, despite the spring pressure exerted thereon by the spring 10.

As shown in FIG. 3, in this third position of the cam member 13 the locking rod 7 is pressed so far downward that the lower edge of the locking disk 9 presses against the periphery of the wheel 4, whereby this wheel 4 is prevented from rotating.

The locking disk 9 is provided along its periphery with a series of teeth or recesses 9'', while one of the lugs 2 of the yoke has a lip 2' pressed out inward (see FIG. 2), which may fall into each space between two teeth 9'', so that at the same time, in each position of swing of the yoke in a wheel 4 secured by the locking disk 9, the swinging motion of the yoke is likewise blocked.

We claim:

1. In a swiveling wheel assembly having a wheel which has a bearing surface and which is attachable to an object such as a leg of a hospital bed, including,
    a yoke having a generally horizontally running top plate and two lugs projecting downwardly between which said wheel is pivotably connected and a tooth portion, said yoke having a locked swivel position,
    a vertical fastening member for attachment to said object,
        said top plate being connected to freely rotate about a vertical axis of rotation with said vertical fastening member,
    a generally rod shaped locking member which is guided to slide by said fastening member,
    a brake member including a locking disk having a recess therein,
    a cam follower,
    a cam member mounted for rotary movement about a shaft in said fastening member, said shaft mounted transverse to the vertical axis of rotation of said yoke, said cam member having a peripheral portion,
        said locking member having its lower end attached to said locking disk and its upper end connected to said cam follower,
    said cam follower cooperating with said cam member,
    a spring member for maintaining said locking member under upward spring tension thereby holding the cam follower in engagement with said cam member,
    said locking disk including a brake portion which portion is pressable against said bearing surface of said wheel,
        whereby when said cam member is turned the locking rod and its attached locking disk can be brought into three different positions with respect to the distance between said disk and the top plate of said yoke, and
            when in a first position the yoke is able to swing freely about its vertical axis of rotation,
            when in a second position the cam follower rests against a portion of the periphery of said cam member, the radial distance from the axis of rotation of said cam member is greater or smaller than that of the portion of the periphery of the cam member against which the cam follower rests when in said first position and wherein said yoke is locked in at least one swivel position when said recess of said locking disk engages said tooth portion of said yoke,
        and when in a third position the distance between said locking disk and the top plate of said yoke is at its greatest and said brake portion of said locking disk is pressed against said wheel, wherein the improvement comprises:
    said brake member includes a toggle lever mechanism comprising a first and a second element (23, 21) rotatably connected together wherein said first element (23) is rotatably fastened to the upper end of the rod-shaped locking member (7) and the second element (21) is rotatably connected to the vertical fastening member (6), and coupling means for coupling one of said first and second elements (23, 21) to the cam member (13) whereby, when the cam member (13) rotates from the first or second position into the third position, the toggle lever mechanism is brought from an unextended position into essentially an extended position, wherein a line drawn between the axes of rotation of the toggle lever mechanism is essentially aligned with the longitudinal axis of the locking member (7) and the locking member (7) is displaced downward against the spring member (10) with respect to the first and second positions whereby the lower edge of the locking disk (9) is pressed against the wheel (4).

2. The swiveling wheel assembly according to claim 1, wherein the first and second elements of the toggle lever mechanism include, respectively, a link-shaped oblong element (23) and at least one intermediate member (21) that is rotatably mounted about the transverse axis of rotation of the cam member (13), whereby the longitudinal axis of the link-shaped oblong element (23) is formed by a line through the axes of rotation (22, 24) of said intermediate element (21) and said oblong element (23), respectively,
    and wherein the intermediate member (21) and the locking member (7), when in the first and second positions of the cam member (13), the longitudinal axis of the link-shaped oblong element (23), in the associated first and second positions of said oblong element, extends essentially transverse to the locking member (7), and wherein the intermediate member (21) includes first means (21") for engaging the cam member (13) so that when the cam member rotates from the first or second position into the third position, the intermediate member is turned into a position wherein its axis of rotation (22) is between said intermediate member and the link-shaped oblong element and also located between the axis of rotation (24) of the locking member (7) and the axis of rotation of the cam member, so that the longitudinal axis of the link-shaped oblong element extends so as to be approximately aligned with the longitudinal axis of the locking member (7), and means for preventing the drive member from being turned out of the said position by the spring pressure of said spring member.

3. The swiveling wheel assembly according to claim 2, wherein the link-shaped oblong element (23) includes a bulge portion (23') above its rotatable connection (24) with the locking member (7), said bulge portion in the first and second positions resting against the periphery of the cam member (13), whereby the link-shaped oblong element (23) forms a cam follower.

4. The swiveling wheel assembly according to claims 2 or 3, wherein the means for coupling the intermediate member (21) to the cam member (13) includes a projection member (19), projecting in an axial direction from the cam member, for engaging said first means (21"), said first means having a surface running essentially radially of the intermediate member (21).

5. The swiveling wheel assembly to claim 2 or 3, wherein the link-shaped oblong element (23), in the third position thereof, is turned just past the position in which the line of the longitudinal axis of said oblong element runs through the axis of rotation of the cam member (13), while the link-shaped oblong element includes near its rotary connection (22) with the intermediate member (21), a tooth-shaped projection (23") which in the third position of said oblong element (23), said projection engages a notch (16) in the periphery of the cam member (13), and wherein the cam member includes a stop means (17) which, in said third position, rests against a fixed detent (20) of said fastening member (6).

6. The swiveling wheel assembly according to claim 5, wherein the cam member (13) includes a stop portion having a surface (17) running radially inward from the periphery of the cam member, and wherein the detent includes a radial surface (20') on a projection portion (20) of said vertical fastening member, which projection portion extends inward toward the axis of rotation of the cam member.

7. The swiveling wheel assembly according to claim 6, wherein the cam member (13) includes a second radial surface (18), running inward from the periphery thereof, which in the first or second position of the cam member rests against a second radial surface (20") of said projection portion (20).

8. The swiveling wheel assembly according to claims 1, 2, or 3, wherein the locking disk (9) has a series of recesses (9") along the periphery therof which are spaced equal distances apart, and wherein at least one of the lugs of the yoke includes a projection (2') directed inward, which, in the third position of the locking member (7) and the locking disk, engages in one of the said recesses (9").

* * * * *